March 23, 1954   J. B. BRENNAN   2,673,121
APPARATUS FOR SPRAYING THERMOPLASTIC MATERIAL
Filed Aug. 18, 1948   2 Sheets-Sheet 1

INVENTOR.
Joseph B Brennan
BY West & Oldham
Attorneys

March 23, 1954    J. B. BRENNAN    2,673,121
APPARATUS FOR SPRAYING THERMOPLASTIC MATERIAL
Filed Aug. 18, 1948    2 Sheets-Sheet 2

INVENTOR.
JOSEPH B. BRENNAN
BY
*West & Oldham*
ATTORNEYS

Patented Mar. 23, 1954

2,673,121

UNITED STATES PATENT OFFICE 2,673,121

APPARATUS FOR SPRAYING THERMO-
PLASTIC MATERIAL

Joseph B. Brennan, Cleveland, Ohio

Application August 18, 1948, Serial No. 44,954

6 Claims. (Cl. 299—28.8)

This invention relates to spraying thermoplastic materials, especially to apparatus for spraying materials of this type.

Heretofore there has been appreciable work done in the spraying of metallic materials and several commercial devices are available by which wire can be continuously fed to a spray gun so as to obtain a constant stream of sprayed molten particles from the gun. These guns normally have merely melted the material being sprayed by means of combustible gases which are continuously supplied to the gun. A carrier gas is also supplied to the spray gun, under pressure, to transport particles of the molten metal produced in the gun.

The general object of the present invention is to provide a novel spraying apparatus by which a thermoplastic material can be sprayed.

Another object of the invention is to provide novel apparatus for spraying thermoplastic material in a safe, efficient and continuous manner and which utilizes heat supplied by electrical energy for fusing the thermoplastic material.

A further object of the invention is to provide an easily controlled automatic apparatus for spraying thermoplastic substances.

Another object of the invention is to provide inexpensive, sturdy, compact apparatus for spraying thermoplastic materials.

A further object of the invention is to use a new heating principle in spraying operations.

A further object of the invention is to heat an extrusion cap by high frequency electrical energy or otherwise and to transmit heat from such cap to the material to be sprayed.

The foregoing and other objects and advantages of the invention will become more apparent as the specification proceeds.

Attention is now directed to the accompanying drawings, wherein.

The present invention relates, broadly speaking, to the spraying of any thermoplastic material by means of a heated apertured end member into which a wire of thermoplastic material, such as a resin, is forced. The heat melts the resinous material and the pressure thereon extrudes same through the end member after which a carrier gas is forced along the outer surface of the end member to pick up the extruded, plastic resin material and carry it for deposit onto a given surface. The material to be sprayed may comprise nylon, cellulose acetate, partially reacted phenyl formaldehyde resins, urea formaldehyde resins, acrylic resins, etc., or other meltable resinous materials. Normally the material to be sprayed will have very little or no solvent contained therein. If a thermo-setting resin is sprayed in accordance with the invention, it would naturally have to be processed prior to the first setting up of the resin. The apertured end member into which the resinous material is to be forced for melting same may be heated in any desired manner but preferably this heating is done electrically and usually is done by the use of a high frequency electrical field which is used to produce inductive electrical energy in the end member to heat it for heating the material to be sprayed, or a condenser heating action can be used to heat a dielectric material directly when it is in the condenser field.

Figure 2:
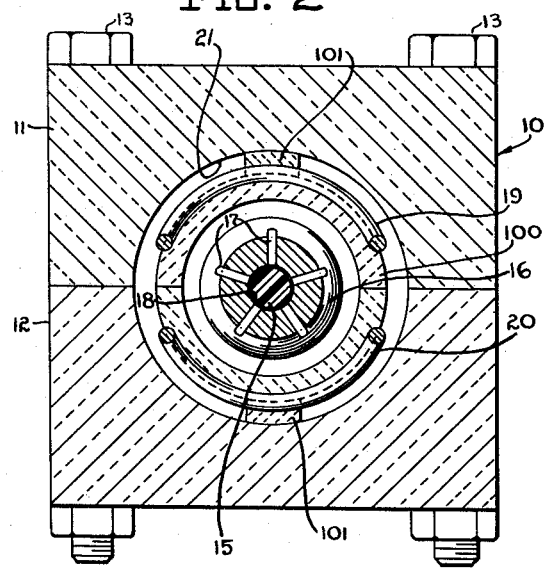
Fig. 2 is a vertical cross section taken on the line 2—2 of Fig. 1.

Reference is now made to the details of the structure shown in the accompanying drawings and a spray nozzle indicated generally by the numeral 10 is shown. Normally the nozzle 10 is preferably formed from ceramic material, although other electrically non-conductive materials may be used in forming the nozzle of the invention. Fig. 2 best shows that the nozzle 10 includes an upper body section 11 and a lower body section 12 which are secured together by means of removable bolts 13. The body sections 11 and 12 combine to form a bore 14 that extends the length of the nozzle 10 and receives a wire or rod 15 formed from the material to be processed by the device of the invention. As indicated above, the wire 15 may be formed from any thermoplastic material which may even be a low melting point metal or alloy.

Figure 1:
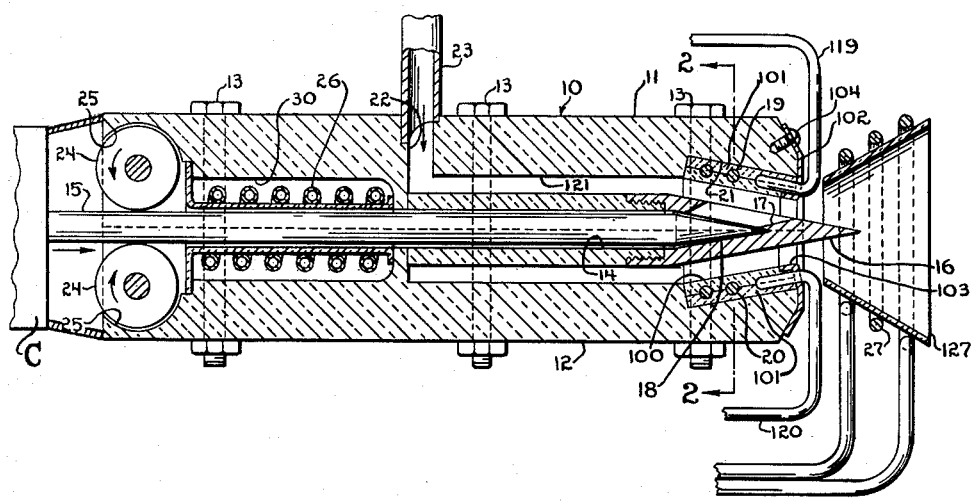
Fig. 1 is a longitudinal cross section through one embodiment of apparatus for practicing the invention.

As an important feature of the present invention, an apertured, conical, metallic end member or cap 16 is provided and it is shown to be in threaded engagement with the spray nozzle 10 at the discharge end of the bore 14. The end cap 16 is provided with a plurality of apertures 17 therein and these apertures 17 may be of any desired form as long as they will permit flow of melted material therethrough. Fig. 1 best shows that the end cap 16 has a bore 18 which is of conical shape narrowing in a direction toward the exterior of the spray nozzle 10. Fig. 2 shows that the apertures 17 are narrow with relation to a diameter of the end cap 16.

The wire 15 is melted when in the end cap 16 by means of a dielectric heating action that may be produced by a condenser which is shown as being formed from electrical coil sections 19 and 20 that are positioned within a tubular recess 21 formed in the body of the spray nozzle 10 in encompassing relation to the end cap 16 and the section of the bore 14 adjacent same. The recess 21 is more or less of a counterbore formed in an annular recess 121 that extends a portion of the length of the nozzle in spaced relation to the bore 14. The recess 121 is provided with an inlet port 22 which has a conduit 23 suitably attached thereto whereby the conduit 23 may be connected to a source of high pressure carrier gas for any plastic material forced or extruded through the apertures 17 in the end cap 16. The coil sections 19 and 20 are supplied with high frequency electrical energy by suitable conductors 119 and 120 connecting thereto, respectively, so that the coils 19 and 20 form, in effect, a condenser with the end cap 16 being positioned therebetween so that a dielectric material in the end cap will be directly heated by the condenser field to a desired temperature, dependent upon the frequency and current supplied to the coils 19 and 20.

Fig. 1 also shows that the coils 19 and 20 are positioned in the nozzle 10 on the outer surface of a split liner sleeve 100 and are retained in such a position by means of spacer bars 101. The liner sleeve 100 is of such length and radial thickness that it will substantially completely occupy the recess 21 and provide a smooth end surface for the recess 121. The discharge end portion of the recess 121 thus is parallel to the outer surface of the end cap 16 which provides a conical inner surface for association with the thermoplastic wire 15 to facilitate melting same progressively and continuously. The liner sleeve 100 is retained in place by a retainer disc 102 that has an inwardly directed annular flange 103 formed thereon that engages with the bore of the liner sleeve 100. crews 104 may removably engage the retainer disc 102 to the nozzle 10.

In order to force the wire 15 into the end cap 16, a pair of driven rolls 24 are positioned in the spray nozzle 10 in a counterbore or slot 25 formed therein. The rolls 24 are driven in any suitable manner, as by an air turbine, and usually force the wire 15 first through a cooling coil 26 that is positioned in an enlarged section 30 of the bore 14. The cooling coil 26 is positioned in the spray nozzle 10 in any desired manner and it is supplied with any conventional type of a cooling material, fluid or gas.

In some instances it may be desirable to retain the sprayed particles at as elevated a temperature as is possible while such particles are moving through the atmosphere for deposit. In order to achieve this result when metallic materials are sprayed, an induction heating coil 27 is shown positioned externally of the spray nozzle 10 and preferably diverging outwardly therefrom. The coil 27 increases in radius outwardly of the spray nozzle to compensate for the increasing size of a sprayed field as it moves from the spray nozzle of the invention and may have a mica or other suitable liner 127 to prevent deposit of resin on the coil 27.

It will be noted that the temperature which can be set up in the end cap 16 must be controlled to a temperature below that at which the material forming the end cap 16 melts. By the use of a high melting point metal in forming the end cap 16, relatively low melting point materials may readily and continuously be rendered molten or sufficiently plastic or fluid in the spray nozzle of the invention as to permit them to be forced through the apertures in the end cap and be sprayed from the nozzle in particle form. Obviously, the size of the apertures in the spray nozzle may be varied for spraying different materials and different end caps may be provided so as to give the device of the invention a broad field of materials with which the spray nozzle may be used.

It may be helpful in some instances to use an inert spray or carrier gas which is fed to the apparatus of the invention by means of the conduit 23. One suitable inert gas for this purpose would be carbon dioxide. The carrier gas can be preheated, if it is inert, in an effort to retain the plastic material molten since such carrier will normally cool appreciably in the spray action. Control of the amount sprayed would, of course, depend upon several factors among which are the force applied to the material to be sprayed by means of the rolls 24, another factor would be the size of apertures in the end cap, and another factor would be the pressure on the carrier gas moving along the surfaces of the end cap.

It will be appreciated that the thermoplastic material being sprayed in accordance with the invention may be deposited upon any desired article so as to form a covering thereover, or to form a continuous strip of the sprayed material, or to form other types of deposits, as desired. In some instances it may be desirable to use an electrical resistance heater element in forming the end cap 16, or positioning the metallic element in a high frequency electrical coil may be desirable in some instances to heat the end cap 16 so that it will transmit heat to the material being sprayed. It will also be noted that the high frequency electrical coils or condenser plates used in practice of the invention may be positioned in any desired relation to the nozzle forming components, and condenser plates could be directly substituted for the coils 19 and 20 and be positioned by the liner sleeve 100 and spacer bars 101. That is, the high frequency coil, or equivalent device, may be positioned in recesses formed in the nozzle sections, or it may be otherwise associated with the metal end member 16. Of course, the nozzle components may be formed from a plastic material or other suitable non-conductive materials.

In some instances it may be desirable to circulate cooling fluid through the coils 19, 20 and 27 to retain them at a required temperature and this may be done in any conventional manner. The use of carbon dioxide has been suggested as a carrier gas and a suitable source for such material may be the exhaust gases from an internal combustion engine. This exhaust gas probably would be compressed prior to its use since it is generally desirable to use sixty pounds or more of gas pressure in spraying material in accordance with the invention. Due to the cooling on expansion of such compressed carrier gas, a preheat of same usually is desirable but it will be understood that such heated carrier gas must, as a general rule, have no oxidizing action upon the material to be sprayed.

By provision of the end member or cap 16 which has a conical inner surface, the melting of the material forming the wire 15 is facilitated since the wire can be progressively melted from the outer surface inwardly thereof as the wire is forced into contact with the end cap especially when the end cap is itself being heated. It will be realized that in some instances it may be desirable to use external means for use in feeding the wire 15 into the nozzle of the invention. Furthermore, it may be desired to pre-treat the wire 15 in some manner whereby a chamber C is associated with the nozzle and stores a quantity of the wire 15 therein whereby the wire 15 may be heated, or cooled, as desired. Also, the chamber C may have means therein for aiding in feeding the wire 15 to the nozzle 10, which means may comprise a gas pressure set up in the chamber C. The nozzle of the invention provides a smooth bore through which carrier gas or air will flow and this is desirable to aid in preventing undesired accumulations of plastic material within the nozzle. Since the nozzle is formed from several sections of material, it can be easily taken apart for cleaning or other maintenance work. Provision of the liner sleeve 100 and the liner 127 for the coil 27 aids in preventing the deposit of sprayed material on the high frequency element associated therewith. Since such elements may be cooled in use, the liners will prevent transmittal of a cold zone to the material being sprayed to avoid accumulation of undesired material within the nozzle.

It should be noted that any carrier gas introduced into the nozzle of the invention and following past the end cap 16 will produce a syphon, or suction effect on any plastic or fluid material contained within the end cap, whereby such materials will be drawn out through the holes or slots 17 in the end cap. While the use of an inductive coil 27 is shown, in some instances where non-conductive materials are being sprayed and it is desired to heat them in transit the coil 27 may be replaced with two condenser coils or plates which would set up an electrical field in the liner 127 to heat the material therein, which liner would usually be made from electrically non-conducting material. The condenser high frequency coils are removably associated with the nozzle so that they can be changed when desired.

Figure 3:
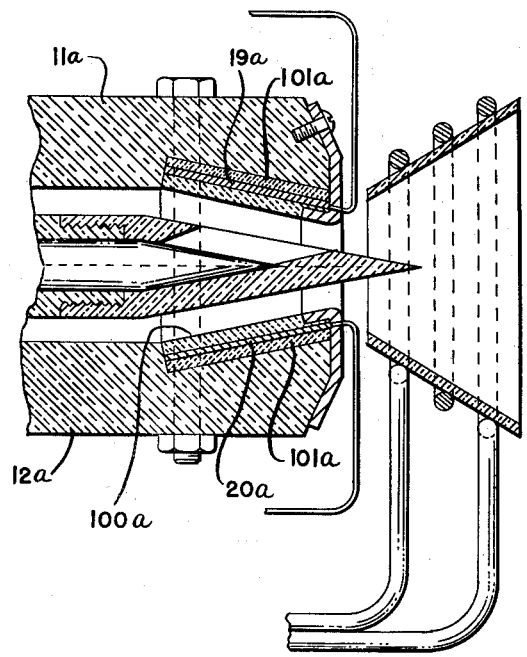
Figs. 3 and 4 are fragmentary vertical sections of modifications of apparatus of the invention.

When it would be desired to produce a porous film by deposit of material by the apparatus of the invention, the material in transit usually should be cooled so that a cooling fluid could be flowed through the coil 27, which usually is made from a tube. Normally, when spraying material which is heated in transit, or when it is sufficiently heated when within the nozzle of the invention, such deposited material will be produced in the form of a strip wherein the particles deposited have coalesced with and overlapped each other. In some instances, the metallic end cap 16 might be replaced by some other type of an end member and with a thermo-plastic material being processed by the practice of the invention and being heated to a fluid, or liquid condition merely by being moved into a high frequency electrical field between condenser members associated with opposed portions of the nozzle. Fig. 3 of the drawings shows a modification of the apparatus of the invention wherein an upper body section 11a and a lower body section 12a are shown. A condenser comprising plates 19a and 20a are positioned in the unit formed of the body sections 11a and 12a by means of a sleeve 100a which may be retained in position by bars 101a.

Figure 4:
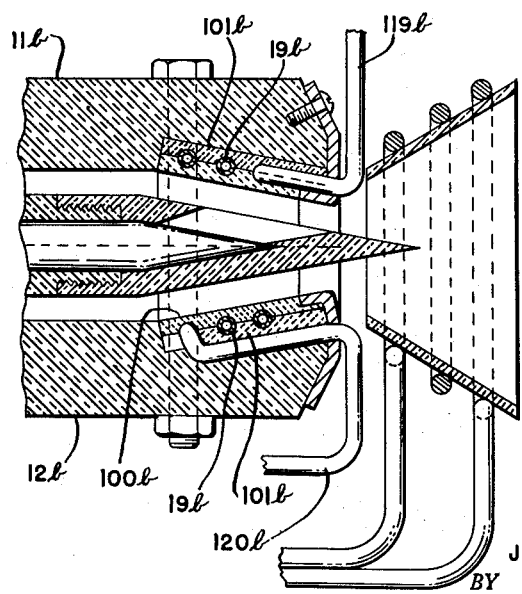

Fig. 4 shows the use of a high frequency induction coil in the apparatus of the invention and it is positioned in an upper body section 11b and a lower body section 12b by means of a sleeve 100b which is retained in position in the body sections by bars 101b. The high frequency induction coil 19b has leads 119b and 120b connecting thereto for supply of high frequency electrical energy thereto.

Applicant herein has a copending application Serial No. 31,690, filed June 8, 1948, now Patent No. 2,648,567, upon a Metallizing Gun, which application covers similar subject matter to that of the present application.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. Apparatus for continuously melting the end of an elongate strip, rod, or tube of a thermoplastic material comprising a member having a bore therein for passing the elongate material therethrough, a hollow conical metal end cap for engagement with the end of the bore of said member, means for cooling said member at a portion thereof remote from said end cap, said end cap having a plurality of apertures formed therein for passage of fused thermoplastic material therethrough, an electro-conductive member positioned adjacent said end cap in spaced relation thereto, said last named member having high frequency electrical energy supplied thereto to set up an electrical field embracing said end cap, means for forcing a compressed carrier gas along the outer periphery of said end cap, and means for continuously forcing the thermoplastic material through the apertures in said end cap.

2. Apparatus for spraying thermoplastic material comprising a ceramic nozzle, electro-conductive plates associated with the discharge zone of said nozzle and being positioned in spaced relation to each other, means for supplying high frequency electrical energy to said plates to set up a high frequency electrical field therebetween, an apertured hollow metal conical end member positioned in said nozzle intermediate and spaced from said plates, means for passing a carrier gas stream along the outer surface of said end member, and means for forcing thermoplastic material into said end member and through the apertures situated on the conical surface of said end member.

3. Apparatus for spraying thermoplastic material comprising a nozzle, a pair of electro-conductive members associated with the discharge zone of said nozzle and being positioned in spaced relation to each other, means for supplying high frequency electrical energy to said members to set up a high frequency electrical field therebetween, a metal end member having multiple apertures thereon positioned in said nozzle intermediate and spaced from said electro-conductive members, said end member being apertured through its outer conical surface, means for passing a stream of a carrier gas along the apertured outer conical surface of said end member, and means for forcing thermoplastic material against and through said apertures in said conical surface.

4. In apparatus for spraying thermoplastic material, a multiple apertured metallic end piece, a condenser having high frequency electrical current supplied thereto encompassing said end piece to heat dielectric material in said end piece to a temperature above its melting point, means for forcing thermoplastic material into and against said end piece, and means for forcing a stream of carrier gas along the outer surface of said end piece.

5. Apparatus as defined in claim 1 in which said electro-conductive member and said metal end cap constitute an induction heating means of which said end cap has heating currents induced therein to heat the same for melting the thermoplastic material contacting said end cap.

6. Apparatus as defined in claim 1 in which said electro-conductive member and said metal end cap constitute an induction heating means of which said end cap has heating currents induced therein to heat the same for melting the thermoplastic material contacting said end cap interiorly thereof, and in which said means for forcing a compressed carrier gas along the outer periphery of said end cap is disposed relative to said end cap and said apertures to form therewith an atomizing means for atomizing the melted thermoplastic material when the latter passes through said apertures.

JOSEPH B. BRENNAN.

References Cited in the file of this patent

UNITED STATES PATENTS

| Number | Name | Date |
|---|---|---|
| 1,323,999 | Baker | Dec. 2, 1919 |
| 1,721,092 | Saeger | July 16, 1929 |
| 2,137,442 | Callan | Nov. 22, 1938 |
| 2,231,247 | Bleakley | Feb. 11, 1941 |
| 2,334,814 | Eckfeldt | Nov. 23, 1943 |
| 2,410,225 | Macht et al. | Oct. 29, 1946 |
| 2,411,409 | Ballard | Nov. 19, 1946 |
| 2,437,263 | Manning | Mar. 9, 1948 |

FOREIGN PATENTS

| Number | Country | Date |
|---|---|---|
| 385,857 | Great Britain | Jan. 5, 1933 |
| 483,517 | Great Britain | Apr. 21, 1938 |
| 553,099 | Great Britain | May 7, 1943 |
| 607,654 | Great Britain | Sept. 2, 1948 |